United States Patent [19]
Haglund

[11] 3,773,443
[45] Nov. 20, 1973

[54] ROTARY MACHINE SIDE SEAL ARRANGEMENT

[75] Inventor: Robert J. Haglund, Birmingham, Mich.

[73] Assignee: General Motors Corporation, Detroit, Mich.

[22] Filed: May 4, 1972

[21] Appl. No.: 250,272

[52] U.S. Cl. .............................................. 418/142
[51] Int. Cl. ... F01c 19/00, F04c 15/00, F04c 27/00
[58] Field of Search ...................................... 418/142

[56] References Cited
UNITED STATES PATENTS

| | | | |
|---|---|---|---|
| 3,697,202 | 10/1972 | Reinhart | 418/142 |
| 3,131,945 | 5/1964 | Scherenberg | 418/142 |
| 3,180,560 | 4/1965 | Paschke | 418/142 |

*Primary Examiner*—William L. Freeh
*Attorney*—J. L. Carpenter et al.

[57] ABSTRACT

A rotor for a rotary machine has side seals that are arranged on the sides of the rotor in staggered radial locations to reduce housing wear, sharpness of any steps in the housing wear pattern and thereby reduce side seal wear and also corner seal wear.

3 Claims, 2 Drawing Figures

ROTARY MACHINE SIDE SEAL ARRANGEMENT

This invention relates to a rotary machine side seal arrangement and more particularly to a rotor for a rotor machine having side seals with staggered locations.

In the presently commercial rotary combustion engines of the Wankel type, it is conventional practice to have the rotor's side seals similarly located with wear of the engine housing's end walls which are engaged by these side seals minimized by choosing the end walls and side seal materials for compatibility and wear life and also by forming certain hardness patterns in the end walls in relation to the wiping motion of these seals. Nevertheless, I have found that a substantial degree of wear may still occur and that this appears to be caused by the sharp edged ridges which these side seals pound into the end walls at ignition.

The rotary machine side seal arrangement according to the present invention provides for further minimizing wear by the provision of axially facing circular arc side seals in each rotor side having different radii from centers that are equally radially spaced from the rotor axis and that may also be equally angularly spaced in the same direction from the axial locations of the corner seals. I have found that by the staggered sliding side seal contact with the end walls, any wear ridges produced in the side housings particularly at ignition are softened and as a result the end housing wear is reduced and thereby the wear of the side seals and corner seals which pass over this side seal wear area.

An object of the present invention is to provide a new and improved rotary machine side seal arrangement.

Another object is to provide a rotor for a rotary machine having radially staggered side seals for reducing end housing wear.

Another object is to provide a rotor for a rotary machine having side seals with staggered radial locations to reduce end housing wear and also the sharpness between any steps in the wear area and thereby reduce side seal and corner seal wear.

Another object is to provide a rotor for a rotary machine having circular arc side seals having different radii from centers that are equally radially spaced from the rotor axis to reduce wear.

These and other objects of the present invention will be more apparent from the following description and drawing in which.

Figure 1:
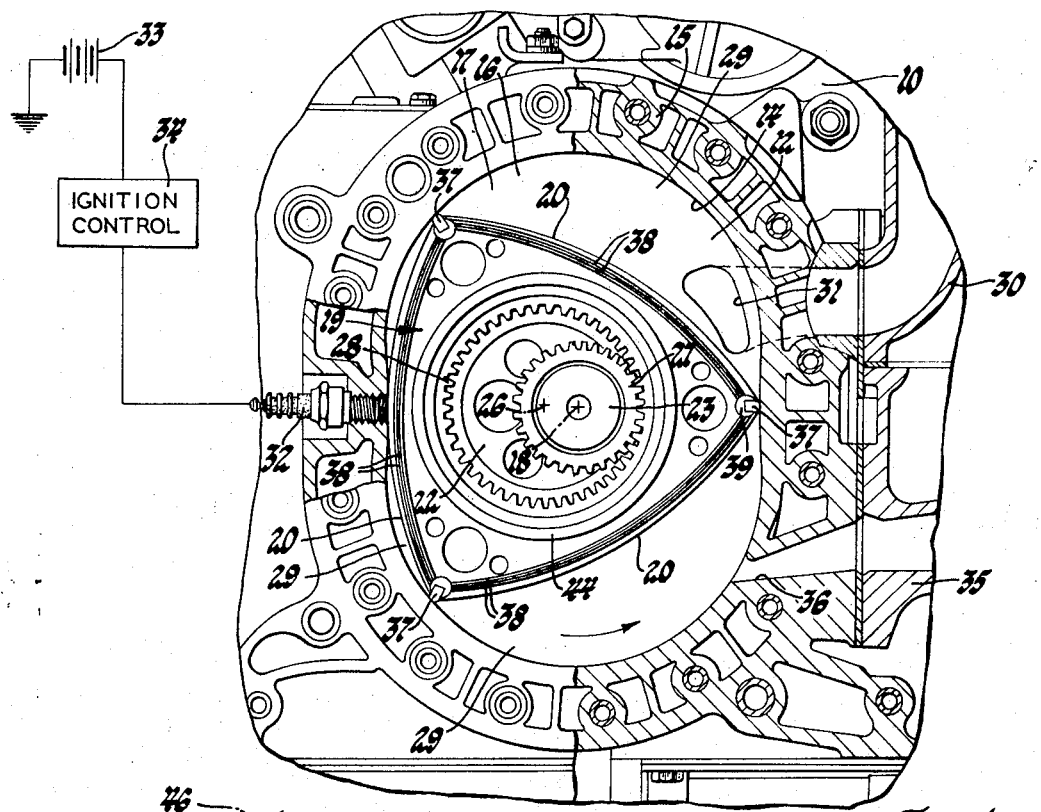
FIG. 1 is a fragmentary sectional side view of a rotary combustion engine with one end housing removed having a rotor with a side seal arrangement according to the present invention.
Figure 2:
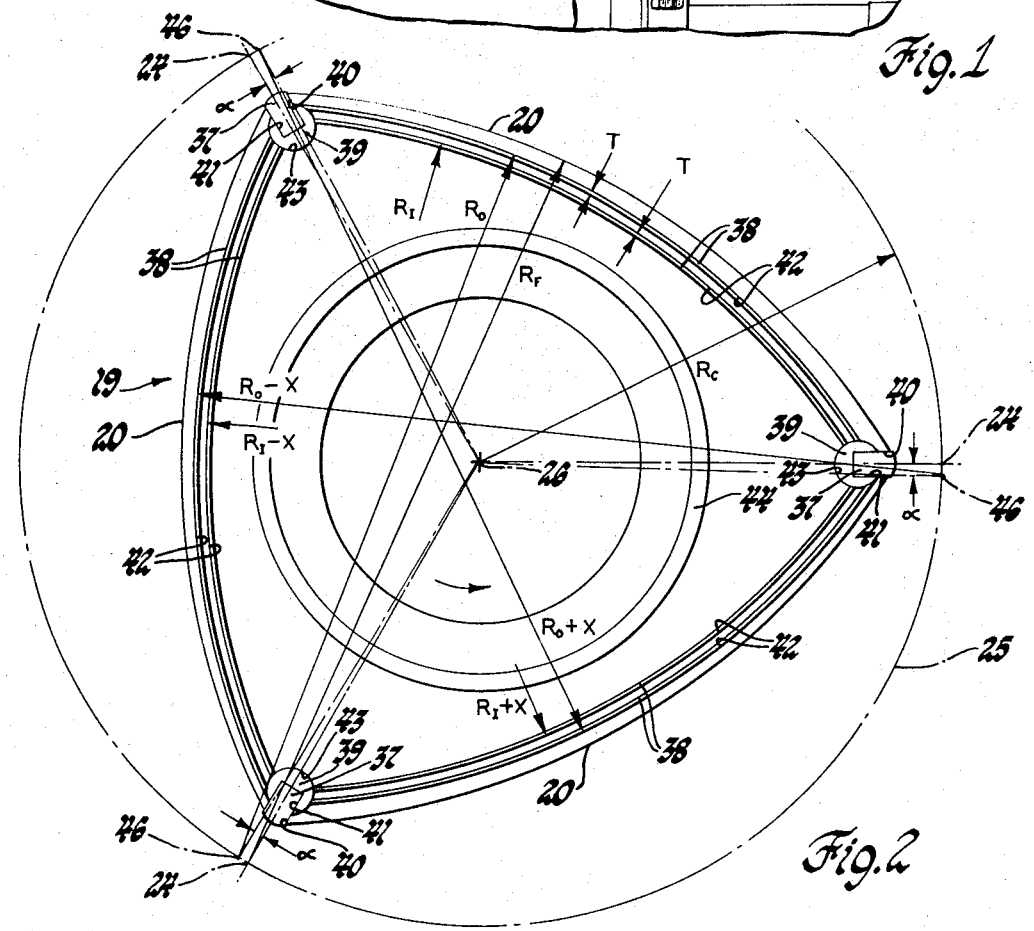
FIG. 2 is an enlarged view of the rotor in FIG. 1.

The rotor side seal arrangement according to the present invention is for use in rotary machines including rotary combustion engines, compressors, pumps and the like. Referring to FIG. 1, the rotary engine may, for example, be an internal engine of the Wankel type comprising a stationary outer body or housing 10 having a rotor cavity 12 that is defined by an inwardly facing internal peripheral wall 14 of a rotor housing 15 and a pair of inwardly facing end walls 16 of end housings 17. In the Wankel engine the peripheral wall 14 is in the shape of a two-lobed epitrochoid or a curve parallel thereto having a center line 18 and a rotor 19 having the general shape of a triangle with three peripheral faces 20 is rotatably mounted within the rotor cavity 12 on an eccentric 22 of a crankshaft 23. Regarding the shape of faces 20, it is present commercial practice that they each be a circular arc having a radius $R_F$ whose center 24 lies on a circle 25 about the rotor axis 26 having a radius $R_C$ as shown in FIG. 2. Crankshaft 23 is rotatably mounted outboard of the rotor cavity in the end housings 17 for rotation about the center line 18 of peripheral wall 14. An annular external toothed gear 27 is received with clearance about one end of the crankshaft 23 and is fixed to one of the end housings 17 and meshes with an internally toothed ring gear 28 which is concentric with and secured to the rotor 19. The meshing gears 27 and 28 enforce a fixed, cyclic relation between the rotor and the crankshaft while the rotor faces 20 cooperate with the peripheral wall 14 and end walls 16 to define three variable volume working chambers 29. The chambers 29 are peripherally spaced around the rotor and move with the rotor within the housing as the rotor rotates about its axis 26 and planetates with respect to the crankshaft axis 18 to rotate the crankshaft 23. An intake manifold 30 receiving fuel-air mixture from a conventional carburetor system, not shown, is secured to the housing 10 and is connected via an intake port 31 through one of the end walls 16 to the rotor cavity whereby as the rotor 19 planetates as it revolves in the direction indicated by the arrow in FIG. 1 it periodically opens and closes the intake port 31 to provide for periodic admission of fuel-air mixture to each chamber 29. It will also be understood that there may be another intake port in the opposite end wall identical to and opposite the intake port 31. A spark plug 32 supplied with voltage from a source 33 by operation of a conventional ignition control 34 ignites the fuel-air mixture in each chamber at or near the end of compression with the rotor at or near its top-dead-center position for that chamber, one such position being shown in FIG. 1. An exhaust manifold 35 secured to the engine housing 10 is connected via a peripheral exhaust port 36 to the rotor cavity whereby after expansion the products of combustion from each chamber are exhausted as the rotor planetates and periodically opens and closes this exhaust port. Thus with the single rotor and with each chamber undergoing intake, compression, expansion and exhaust there is provided a power phase for each revolution of the crankshaft. The structure thus far described is conventional and operates efficiently assuming there is sealing between the working chambers of the engine.

Sealing of the chambers 29 is effected by a sealing arrangement comprising an apex seal 37 at each rotor apex and arcuate side seals 38 on each rotor side which extend in pairs between the rotor apexes with a corner seal 39 near each rotor apex providing a sealing link between the adjacent ends of the side seals and apex seals. Referring to FIGS. 1 and 2, each of the apex seals 37 is mounted in a radially outwardly facing groove 40 at each rotor apex that extends axially from one rotor side to the other with the apex seal being received at its outboard ends in axially extending, radially outwardly facing groove 41 in the corner seals 39. The side seals 38 are mounted in accommodating arcuate grooves 42 in the two sides of the rotor and extend between and sealingly engage the corner seals 39 which are mounted in accommodating apertures 43 in the two sides of the rotor, each of the corner seal apertures being contiguous with the one end of each apex seal groove and the ends of the two pairs of side seal grooves at each rotor apex. The apex seals 37 are urged in a radially outward direction by suitable springs, not shown, to engage the peripheral wall 14 and both the side seals 38 and corner seals 39 are urged axially outward by suitable springs, not shown, to engage the end walls 16. With regard to the path of travel of the corner seals 39, the intake port 31 is located sufficiently radially inward of the peripheral wall 14 so that as the rotor 19 planetates, the corner seals on this rotor side do not protrude into the intake port 31 but instead remain in sliding contact with the end wall 16. In addition to this gas sealing arrangement, there is concentrically mounted on each rotor side a circular oil seal 44 that sealingly contacts the opposite end wall.

Referring to FIG. 2, the side seals 38 are provided with staggered radial locations from the rotor axis 26 so that all of the side seals trace different paths on the end housing walls 16 as the rotor makes one complete revolution. This is accomplished by the side seals 38 having the shape of circular arcs having different radii from centers 46 that are located on the circle 25 and are thus equally radially spaced radius $R_C$ from the rotor axis 26 whereby the side seals in each rotor side are at different radial distances from the rotor axis 26 along their entire length. With the seals having a radial thickness T and the radially outer and inner side seals of one pair having mean radii of $R_O$ and $R_I$, respectively, another pair of side seals are provided with mean radii of $R_O - X$ and $R_I - X$ while the third pair of side seals are provided with radii of $R_O + X$ and $R_I + X$ with X preferably made less than T so that there is overlapping of the paths of travel of the radially outer side seals and also of the paths of travel of the radially inner side seals. For maximization of the intake port side without permitting dropping of the leading end of each of the side seals 38 into the intake port 31, the centers 46 are all equally angularly spaced at an angle $\alpha$ from the angular locations of the corner seal apertures which are themselves equally radially spaced from and equally angularly spaced about the rotor axis 26, this angular displacement of the side seal groove centers 46 being measured in a direction from the corner seal aperture location opposite the direction of rotor rotation indicated by the arrow in FIG. 2. As a result the leading end of each of the side seals 38 contacts the leading corner seal 39 at a longer distance from the rotor axis than where the trailing end of each of the side seals contacts the trailing corner seal 39. This displacement of the leading ends of the corner seals is made sufficiently radially outward so that on rotor planetation they remain against the end walls 16 and do not protrude into the intake port with the trailing portion of the side seals then wiping across the intake port. With this overlapping of the paths of travel of the side seals the side seal wear pattern on the end walls 16 is thus enlarged in area and reduced in depth as compared with where the side seals would all be located at the same radius, this reduction in wear being particularly noticeable in the area of top-dead-center at ignition where there is a smoothing of the sharpness between steps in the wear pattern with the result that the wear of the side seals and also the corner seals is reduced.

The above described embodiment is illustrative of the invention which may be modified within the scope of the appended claims.

I claim:
1. A rotor for a rotary machine having an axis of rotation, a plurality of adjoining peripheral faces spaced about said axis, a pair of sides spaced along said axis and extending radially to said faces and having corners where said faces adjoin, an axially facing corner seal aperture in each said corner, a corner seal mounted in each said corner seal aperture, an axially facing side seal groove in each said side extending adjacent each said face and intercepting said corner seal apertures at the circumferentially spaced ends of each said face, a side seal mounted in and extending the length of each said side seal groove and engaging at each end with one of said corner seals and providing a sealing surface, and all of said side seals and accommodating grooves in each said side having corresponding points at different radial distances from said axis along their entire length whereby each of side seals cooperates with a sealing surface to form seal areas at different radii with respect to said axis.

2. A rotor for a rotary machine having an axis of rotation, a plurality of adjoining peripheral faces spaced about said axis, a pair of sides spaced along said axis and extending radially to said faces and having corners where said faces adjoin, an axially facing corner seal aperture in each said corner, a corner seal mounted in each said corner seal aperture, an axially facing circular arc side seal groove in each said side extending adjacent each said face and intercepting said corner seal apertures at the circumferentially spaced ends of each said face, a circular arc side seal mounted in and extending the length of each said side seal groove and engaging at each end with one of said corner seals and providing a sealing surface, and all of said circular arc side seal grooves in each said side having corresponding points having different radii from centers that are equally radially spaced from said axis whereby each of side seals cooperates with a sealing surface to form seal areas at different radii with respect to said axis.

3. A rotor for a rotary machine having an axis of rotation, a plurality of adjoining peripheral faces spaced about said axis, a pair of sides spaced along said axis and extending radially to said faces and having corners where said faces adjoin, an axially facing corner seal aperture in each said corner, all of said corner seal apertures equally radially spaced from said axis and equally angularly spaced about said axis, a corner seal mounted in each of said corner seal apertures, an axially facing circular arc side seal groove in each said side extending adjacent each said face and intercepting said corner seal apertures at the circumferentially spaced ends of each said face, a circular arc side seal mounted in and extending the length of each said side seal groove and engaging at each end with one of said corner seals and providing a sealing surface, and all of said circular arc side seals and accommodating side seal grooves in each said sides having corresponding points having different radii from centers that are equally radially spaced from said axis and are equally angularly spaced from the angular locations of said corner seal apertures whereby each of side seals cooperates with a sealing surface to form seal areas at different radii with respect to said axis.

* * * * *